(12) United States Patent
Xie et al.

(10) Patent No.: US 10,602,760 B2
(45) Date of Patent: Mar. 31, 2020

(54) SLENDER AND FUNNEL-SHAPED JET NOZZLE STRUCTURE

(71) Applicant: Shanghai Ocean University, Shanghai (CN)

(72) Inventors: Jing Xie, Shanghai (CN); Yuyan Liu, Shanghai (CN); Jinfeng Wang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 0 days.

(21) Appl. No.: 16/207,019

(22) Filed: Nov. 30, 2018

(65) Prior Publication Data

US 2019/0166888 A1 Jun. 6, 2019

Related U.S. Application Data

(63) Continuation of application No. PCT/CN2017/117616, filed on Dec. 21, 2017.

(30) Foreign Application Priority Data

Dec. 1, 2017 (CN) .......................... 2017 1 1246807

(51) Int. Cl.
*F25D 3/10* (2006.01)
*A23L 3/36* (2006.01)
(Continued)

(52) U.S. Cl.
CPC ............... *A23L 3/361* (2013.01); *A23L 3/001* (2013.01); *B05B 1/048* (2013.01); *F25D 3/10* (2013.01);
(Continued)

(58) Field of Classification Search
CPC ... F25D 25/04; F25D 3/11; F25D 3/10; F25D 2400/30; F25D 17/06; F25D 13/06
See application file for complete search history.

(56) References Cited

U.S. PATENT DOCUMENTS

| 4,336,694 | A | * | 6/1982 | Schmitt | ..................... F25D 3/10 239/568 |
| 5,836,166 | A | * | 11/1998 | Wardle | ..................... A23L 3/361 62/63 |

(Continued)

FOREIGN PATENT DOCUMENTS

| CN | 2530226 Y | 1/2003 |
| CN | 203771857 U | 8/2014 |

(Continued)

*Primary Examiner* — Brian M King
(74) *Attorney, Agent, or Firm* — Wayne & Ken, LLC; Tony Hom

(57) ABSTRACT

A slender and funnel-shaped jet nozzle structure includes a plurality of slender tapered diversion channels, a plurality of slender jet nozzles and a conveyer belt. The wall thickness of the slender tapered diversion channel is 1-5 mm. The wall thickness of the slender jet nozzle is 1-5 mm. A thickness of the conveyer belt is 1-5 mm. The slender tapered diversion channel is a hollow slender truncated cone and includes an upper opening and a lower opening. The upper opening of the slender tapered diversion channel is substantively elliptic, and the lower opening of the slender tapered diversion channel is connected to an inlet of the slender jet nozzle. The slender jet nozzle is a hollow slender elliptic cylinder.

8 Claims, 3 Drawing Sheets

(51) Int. Cl.
*A23L 3/00* (2006.01)
*B05B 1/04* (2006.01)
*F25D 3/11* (2006.01)
*F25D 25/04* (2006.01)
*F25D 17/06* (2006.01)

(52) U.S. Cl.
CPC ............... *F25D 3/11* (2013.01); *F25D 17/06* (2013.01); *F25D 25/04* (2013.01); *A23V 2002/00* (2013.01); *F25D 2400/30* (2013.01)

(56) References Cited

U.S. PATENT DOCUMENTS

| | | | | |
|---|---|---|---|---|
| 6,009,719 | A * | 1/2000 | Ochs | A23L 3/361 62/380 |
| 2004/0099005 | A1 * | 5/2004 | Newman | F25D 3/11 62/374 |
| 2010/0162732 | A1 * | 7/2010 | Newman | F25D 3/11 62/52.1 |

FOREIGN PATENT DOCUMENTS

| | | |
|---|---|---|
| CN | 205425581 U | 8/2016 |
| CN | 106401654 A | 2/2017 |
| JP | S592648 A | 1/1984 |

* cited by examiner

SLENDER AND FUNNEL-SHAPED JET NOZZLE STRUCTURE

CROSS-REFERENCE TO RELATED APPLICATIONS

This application is a continuation of International Patent Application No. PCT/CN2017/117616, filed on Dec. 21, 2017, which claims the benefit of priority from Chinese Application No. 201711246807.3, filed on Dec. 1, 2017. The contents of the aforementioned applications, including any intervening amendments thereto, are incorporated herein by reference.

TECHNICAL FIELD

The present application relates to quick-frozen food processing machinery, and in particular to a slender and funnel-shaped jet nozzle structure.

BACKGROUND

Blast freezers are generally used in frozen food processing, and the impact-type freezer with high convective heat transfer coefficient has become the focus of freezer manufacturers and researchers. The high-speed airflow, originated from the airflow in a plenum chamber released by a nozzle structure, is critically important for a desirable impact effect. The impact effect depends largely on the structure and size of the nozzle structure. The nozzle structure of the existing impact-type freezer usually is a circular orifice plate. However, such structure leads to the problems such as low freezing rate of the frozen products in the freezing area and low uniformity during cooling process.

SUMMARY

In order to solve the above problems, the present application at least provides a jet nozzle of an impact-type freezer.

The present application provides a slender and funnel-shaped jet nozzle structure, including a plurality of slender tapered diversion channels, a plurality of slender jet nozzles and a conveyer belt. A wall thickness of the slender tapered diversion channel is 1-5 mm. A wall thickness of the slender jet nozzle is 1-5 mm. A thickness of the conveyer belt is 1-5 mm.

The slender tapered diversion channel is a hollow slender truncated cone and includes an upper opening and a lower opening. The area of the upper opening is bigger than that of the lower opening. The upper opening of the slender tapered diversion channel is substantially elliptic, and the lower opening of the slender tapered diversion channel is connected to an inlet of the slender jet nozzle. The slender jet nozzle is a hollow slender elliptic cylinder.

The slender tapered diversion channels are in a linear arrangement. A distance between two adjacent slender tapered diversion channels is 70-90 mm. The distance is a distance between geometric centers of two elliptic sections of the two adjacent slender tapered diversion channels. The upper opening of the slender tapered diversion channel has a section with a length of 55-60 mm and a diameter of semicircles on both sides of 40-50 mm, and a height of the slender tapered diversion channel is 30-50 mm.

An outlet of the slender jet nozzle has a section with a length of 15-20 mm and a diameter of semicircles on both sides of 4-6 mm. The height of the slender jet nozzle is 20-40 mm. The conveyer belt is just below the slender jet nozzle, and a distance between the conveyer belt and the slender jet nozzle is 20-40 mm.

In an embodiment, the wall thickness of the slender tapered diversion channel is 1-3 mm, the wall thickness of the slender jet nozzle is 1-3 mm, and the thickness of the conveyer belt is 1-3 mm.

In an embodiment, the wall thickness of the slender tapered diversion channel is 2 mm, the wall thickness of the slender jet nozzle is 2 mm, and the thickness of the conveyer belt is 2 mm.

In an embodiment, the plurality of slender tapered diversion channels are in a linear arrangement, and the distance between two adjacent slender tapered diversion channels is 75-85 mm.

In an embodiment, the distance between two adjacent slender tapered diversion channels is 80 mm.

In an embodiment, the upper opening of the slender tapered diversion channel has a section with a length of 57 mm and a diameter of semicircles on both sides of 45 mm; and the height of the slender tapered diversion channel is 40 mm.

In an embodiment, the outlet of the slender jet nozzle has a section with a length of 17 mm and a diameter of semicircles on both sides of 5 mm; and the height of the slender jet nozzle is 30 mm.

In an embodiment, the distance between the conveyer belt and the slender jet nozzle is 30 mm.

The present invention can effectively increase the freezing rate of the frozen products and improve the flow field uniformity in freezer during cooling process. This reduces the great difference in the cooling rate of frozen products at different freezer positions during food freezing process, and improves the frozen product quality.

Figure 1:
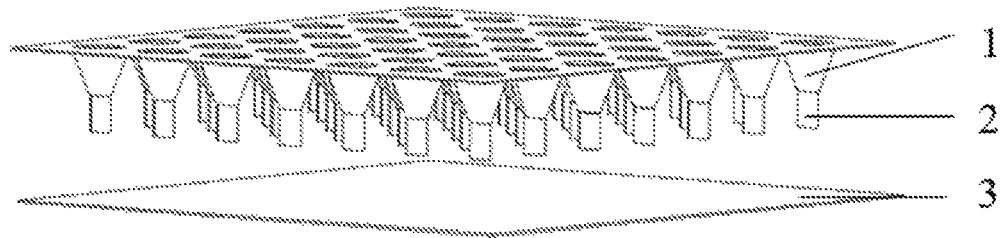
FIG. 1 is a perspective view of a slender and funnel-shaped jet nozzle structure according to an embodiment of the present invention.

In the drawings: 1, slender tapered diversion channel; 2, slender jet nozzle; 3, conveyer belt.

DETAILED DESCRIPTION OF THE PRESENT INVENTION

The present invention will be further described below in conjunction with specific embodiments to make the process and features clearer.

Figure 2:
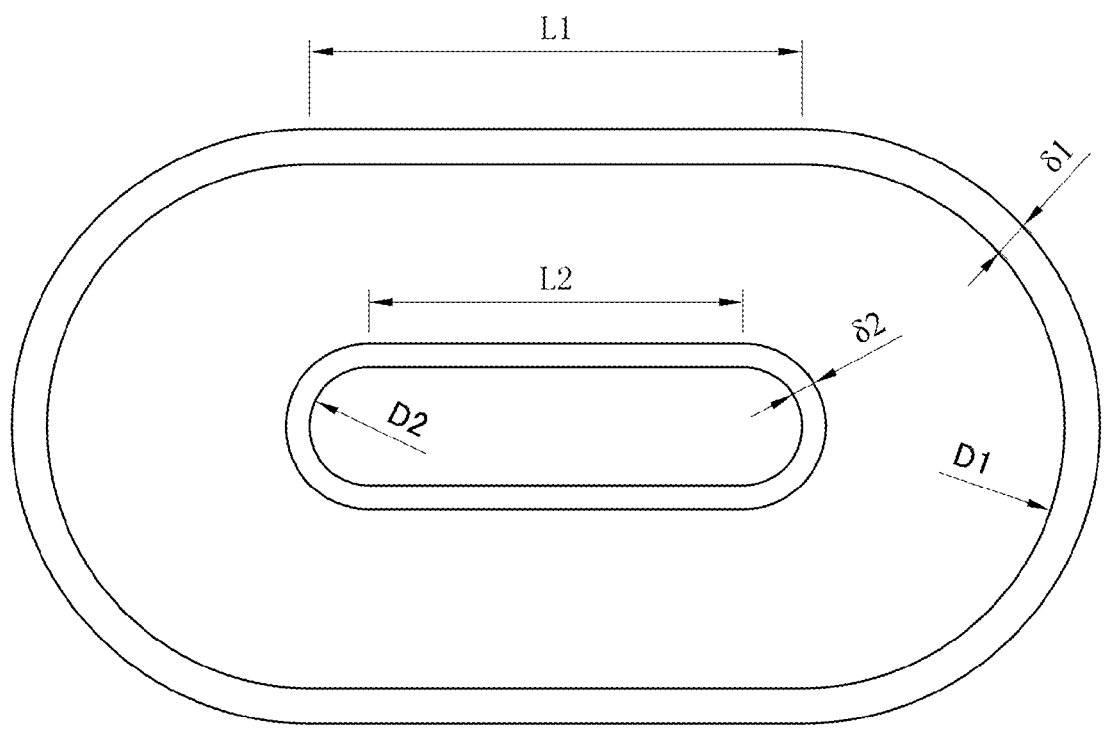
FIG. 2 is a top view of the slender and funnel-shaped jet nozzle structure according to the embodiment of the present invention.
Figure 3:
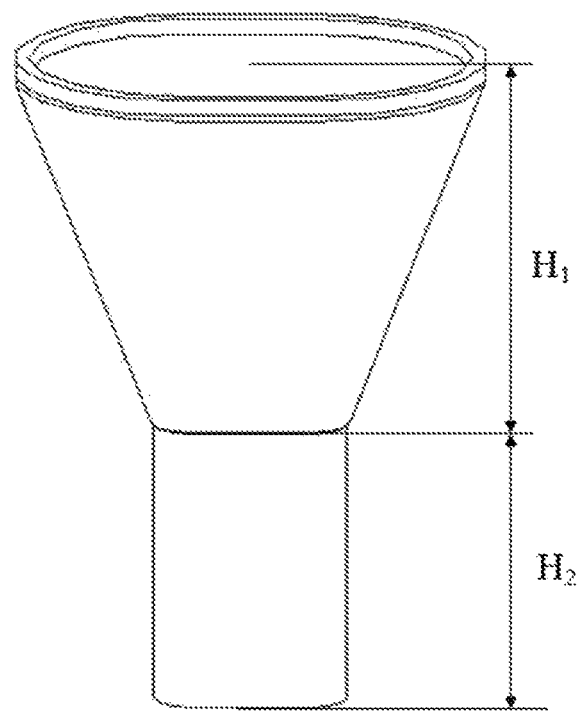
FIG. 3 is a front view of the slender and funnel-shaped jet nozzle structure according to the embodiment of the present invention.

FIGS. 1-3 illustrate an embodiment of the slender and funnel-shaped jet nozzle structure. The jet nozzle structure includes a plurality of slender tapered diversion channels 1, a plurality of slender jet nozzles 2 and a conveyer belt 3. A wall thickness $\delta 1$ of the slender tapered diversion channel 1 is 1-5 mm. A wall thickness $\delta 2$ of the slender jet nozzle 2 is 1-5 mm. A thickness of the conveyer belt 3 is 1-5 mm.

The slender tapered diversion channel 1 is a hollow slender truncated cone and includes an upper opening and a lower opening. The upper opening of the slender tapered diversion channel 1 is substantially elliptic, and the lower opening of the slender tapered diversion channel 1 is connected to an inlet of the slender jet nozzle 2. The slender jet nozzle 2 is a hollow slender elliptic cylinder.

The slender tapered diversion channels 1 are arranged in a linear arrangement. A distance between two adjacent slender tapered diversion channels 1 is 70-90 mm, and the distance is a distance between geometric centers of two elliptic sections of the two adjacent slender tapered diversion channels 1. The upper opening of the slender tapered diversion channel 1 has a section with a length L1 of 55-60 mm and a diameter D1 of semicircles on both sides of 40-50 mm; and the height H1 of the slender tapered diversion channel 1 is 30-50 mm.

An outlet of the slender jet nozzle 2 has a section with a length L2 of 15-20 mm and a diameter D2 of semicircles on both sides of 4-6 mm, and the height H2 of the slender jet nozzle 2 is 20-40 mm. The conveyer belt 3 is just below the slender jet nozzle 2, and a distance between the conveyer belt 3 and the slender jet nozzle 2 is 20-40 mm.

The low-temperature air from an evaporator is drawn by the air blower of the freezer, and then is boosted to flow out. The boosted low-temperature air enters the jet nozzle via the plenum chamber. After being ejected through the nozzle, the low-temperature air flows out of the outlet of the nozzle structure and enters the evaporator for heat transfer, and then is drawn into the air blower for next circle.

Numerical simulation has been performed on the slender and funnel-shaped nozzle structure with a plenum chamber of the quick freezer having a size of 600*600*600 mm and an orifice plate having a size of 600*600*2 mm. An orifice plate structure of a slender elliptic opening is used as a control. Using air as a simulated fluid, assumptions are made as follows: (1) the air is an incompressible fluid; (2) the internal flow field is in a steady state during the normal operation of the model; and (3) the wall of the plenum chamber is insulated. A k-ε turbulence model is employed allowing for the energy equations due to a temperature change during impact. Pressure at the boundary of the inlet is $P_{in}$=250 Pa and pressure at the boundary of the outlet is $P_{out}$=0 Pa. An inlet temperature and an outlet temperature in the freezing area are set as 230 K and 235 K, respectively. The conveyer belt has a thermal conductivity of 16.3 W/(m*° C.).

Through numerical simulation, it is preferred that the wall thickness δ1 of the slender tapered diversion channel 1 is 2 mm, the wall thickness δ2 of the slender jet nozzle 2 is 2 mm, and the thickness of the conveyer belt 3 is 2 mm. The slender tapered diversion channels 1 are preferably in a linear arrangement, and a distance between two adjacent slender tapered diversion channels 1 is preferably 80 mm. It is preferred that the upper opening of the slender tapered diversion channel has a section with a length L1 of 57 mm and a diameter D1 of semicircles on both sides of 45 mm, and the height H1 of the slender tapered diversion channel is 40 mm. It is preferred that the outlet of the slender jet nozzle preferably has a section with a length L2 of 17 mm and a diameter D2 of semicircles on both sides of 5 mm, and the height H2 of the slender jet nozzle is 30 mm. The conveyor belt 3 is preferably arranged just below the slender jet nozzle 2, and the distance between the conveyer belt 3 and the slender jet nozzle 2 is preferably 30 mm.

Results of the numerical simulation to the freezing area of the quick freezer indicate that in the case of same area of the nozzle outlet, the surface of the conveyor belt of the slender and funnel-shaped nozzle structure has an average Nusselt number of 159.89, and the slender nozzle of the conventional orifice plate has an average Nusselt number of 146.06. It can be seen that the average Nusselt number of heat transfer of the slender and funnel-shaped nozzle structure is increased by about 9.47% with a better uniform distribution of Nusselt number.

The present jet nozzle structure can greatly improve the heat transfer on the surface of the conveyor belt and increase the freezing rate of the frozen products as compared to the conventional circular orifice plate structure. Meanwhile, with the significant increase of the flow rate at the nozzle outlet, the flow in the freezing area is improved, leading to the improved evenness during cooling of the frozen products and the improved quality of the frozen products.

The embodiments are merely used to exemplarily illustrate but not to limit the principle and spirit of the present invention. Modifications or variations to the above embodiments may be made by those skilled in the art without departing from the spirit and scope of the invention. Therefore, all of the equivalent modifications or variations also fall within the scope of the claims.

What is claimed is:

1. A slender and funnel-shaped jet nozzle structure, comprising:
a plurality of slender tapered diversion channels;
a plurality of slender jet nozzle; and
a conveyer belt;
wherein a wall thickness of each of the plurality of slender tapered diversion channels is 1-5 mm; a wall thickness of each of the plurality of the slender jet nozzles is 1-5 mm; and a thickness of the conveyer belt is 1-5 mm;
the slender tapered diversion channel is a hollow slender truncated cone and comprises an upper opening and a lower opening; wherein the upper opening of the slender tapered diversion channel is substantively elliptic, and the lower opening of the slender tapered diversion channel is connected to an inlet of the slender jet nozzle; and the slender jet nozzle is a hollow slender elliptic cylinder;
the plurality of slender tapered diversion channels are in a linear arrangement, and a distance between two adjacent slender tapered diversion channels is 70-90 mm, the distance being a distance between geometric centers of two elliptic sections of the two adjacent slender tapered diversion channels; the upper opening of the slender tapered diversion channel has a section with a length of 55-60 mm and a diameter of semicircles on both sides of 40-50 mm; and a height of the slender tapered diversion channel is 30-50 mm; and
an outlet of the slender jet nozzle has a section with a length of 15-20 mm and a diameter of semicircles on both sides of 4-6 mm; and a height of the slender jet nozzle is 20-40 mm; the conveyer belt is arranged just below the slender jet nozzle, and a distance between the conveyer belt and the slender jet nozzle is 20-40 mm.

2. The slender and funnel-shaped jet nozzle structure of claim 1, wherein the wall thickness of the slender tapered diversion channel is 1-3 mm; the wall thickness of the slender jet nozzle is 1-3 mm; and the thickness of the conveyer belt is 1-3 mm.

3. The slender and funnel-shaped jet nozzle structure of claim 1, wherein the wall thickness of the slender tapered diversion channel is 2 mm; the wall thickness of the slender jet nozzle is 2 mm; and the thickness of the conveyer belt is 2 mm.

4. The slender and funnel-shaped jet nozzle structure of claim 1, wherein the plurality of slender tapered diversion channels are in a linear arrangement, and the distance between the two adjacent slender tapered diversion channels is 75-85 mm.

5. The slender and funnel-shaped jet nozzle structure of claim 4, wherein the distance between the two adjacent slender tapered diversion channels is 80 mm.

6. The slender and funnel-shaped jet nozzle structure of claim 1, wherein the upper opening of the slender tapered diversion channel has a section with a length of 57 mm and a diameter of semicircles on both sides of 45 mm; and the height of the slender tapered diversion channel is 40 mm.

7. The slender and funnel-shaped jet nozzle structure of claim 1, wherein the outlet of the slender jet nozzle has a section with a length of 17 mm and a diameter of semicircles on both sides of 5 mm; and the height of the slender jet nozzle is 30 mm.

8. The slender and funnel-shaped jet nozzle structure of claim 1, wherein the distance between the conveyer belt and the slender jet nozzle is 30 mm.

* * * * *